United States Patent [19]
Hull et al.

[11] Patent Number: 5,174,599
[45] Date of Patent: Dec. 29, 1992

[54] STEERING WHEEL DOUBLE AIR BAG PROTECTIVE SYSTEM

[76] Inventors: Harold L. Hull, 401 Canyon Way #43, Sparks, Nev. 89434; William A. Young, 2200 Hudson Dr., Carson City, Nev. 89701

[21] Appl. No.: 858,875

[22] Filed: Mar. 27, 1992

Related U.S. Application Data

[63] Continuation-in-part of Ser. No. 820,137, Jan. 13, 1992.

[51] Int. Cl.⁵ ............................................. B60R 21/16
[52] U.S. Cl. .................................. 280/731; 280/750; 280/753
[58] Field of Search .............. 280/728, 731, 729, 750, 280/751, 753; 74/552

[56] References Cited

U.S. PATENT DOCUMENTS

| | | | |
|---|---|---|---|
| 2,784,006 | 3/1957 | Dye et al. | 280/750 |
| 2,866,357 | 12/1958 | Houghtaling | 74/552 |
| 3,189,367 | 6/1965 | Glass | 280/750 |
| 3,493,244 | 2/1970 | Bozich | 280/750 |
| 3,608,964 | 9/1971 | Earl | 297/397 |
| 3,643,971 | 2/1972 | Kushnick | 280/732 |
| 3,752,501 | 8/1973 | Daniel et al. | 280/731 |
| 3,799,576 | 3/1974 | Fiala | 280/731 |
| 4,032,175 | 6/1977 | Aibe et al. | 280/751 |
| 4,098,525 | 7/1978 | Schwanz et al. | 280/750 |
| 4,287,621 | 9/1981 | Kertz | 5/440 |
| 4,368,901 | 1/1983 | Kojima | 280/748 |
| 4,440,443 | 4/1984 | Nordskog | 297/397 |
| 4,828,287 | 5/1989 | Siler | 280/751 |
| 4,852,907 | 8/1989 | Shiraki et al. | 280/731 |
| 4,915,410 | 4/1990 | Bachelder | 280/732 |
| 4,944,529 | 7/1990 | Backhaus | 280/743 |
| 4,989,895 | 2/1991 | Pearson et al. | 280/731 |
| 5,013,064 | 5/1991 | Miller et al. | 280/730 |
| 5,114,181 | 5/1992 | Songer | 280/750 |

Primary Examiner—Kenneth R. Rice

[57] ABSTRACT

Disclosed is a double air bag protective system to protect the driver of a vehicle from impact with the steering wheel of the vehicle upon light or severe collision, with the second air bag being filled upon installation and positioned between the steering wheel and the driver while the first air bag inflates upon severe collision for added protection. *Both* air bags may be inflated manually to check for position and leaks and the inflation system is replacable after a collision.

15 Claims, 4 Drawing Sheets

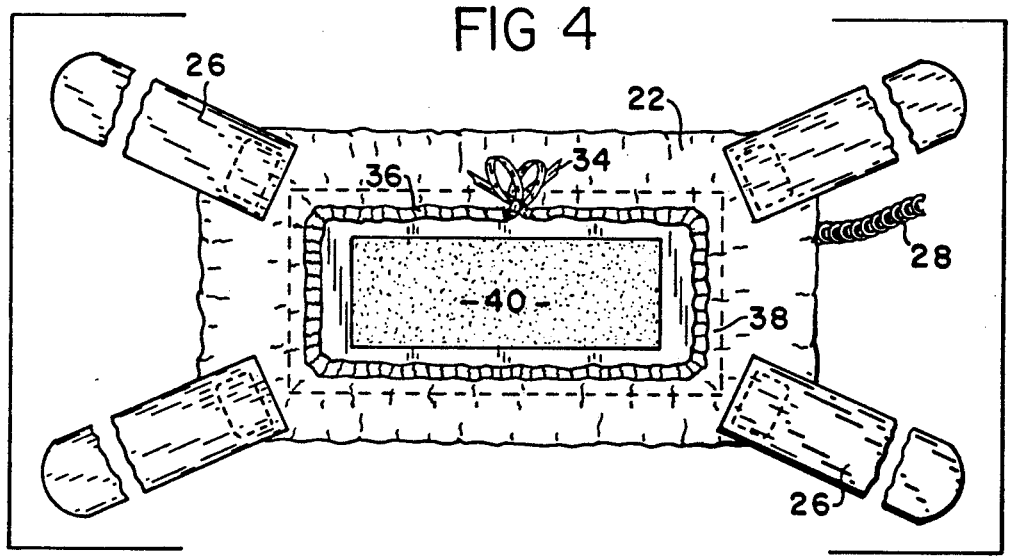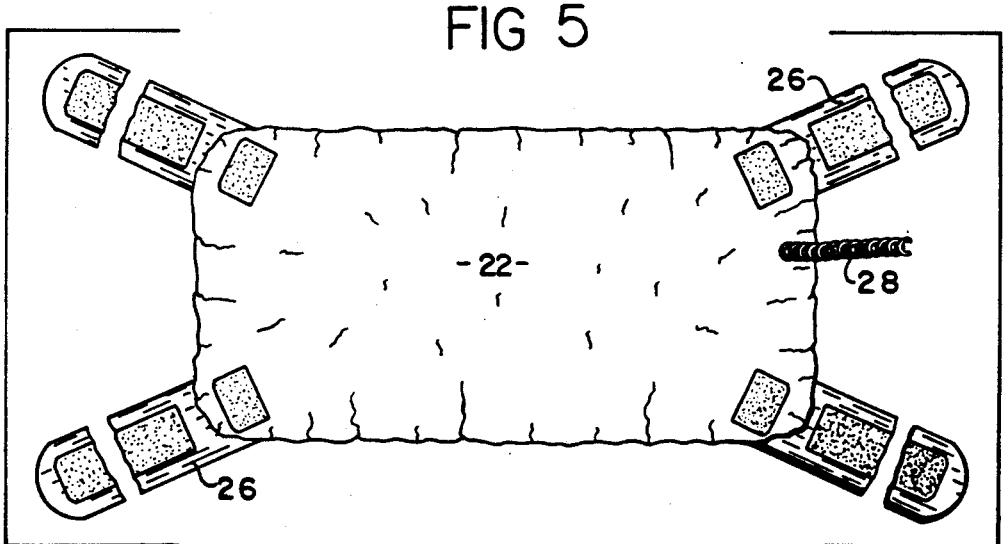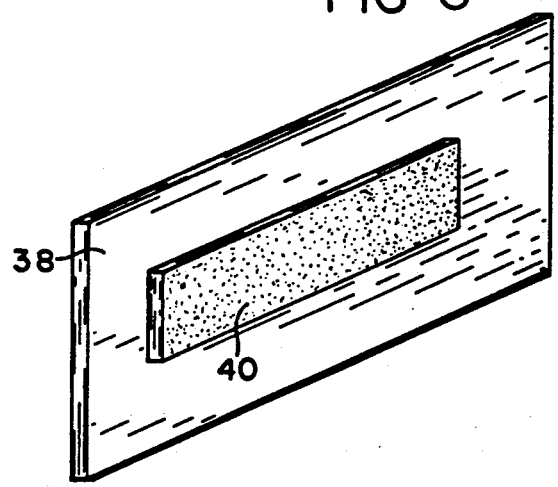

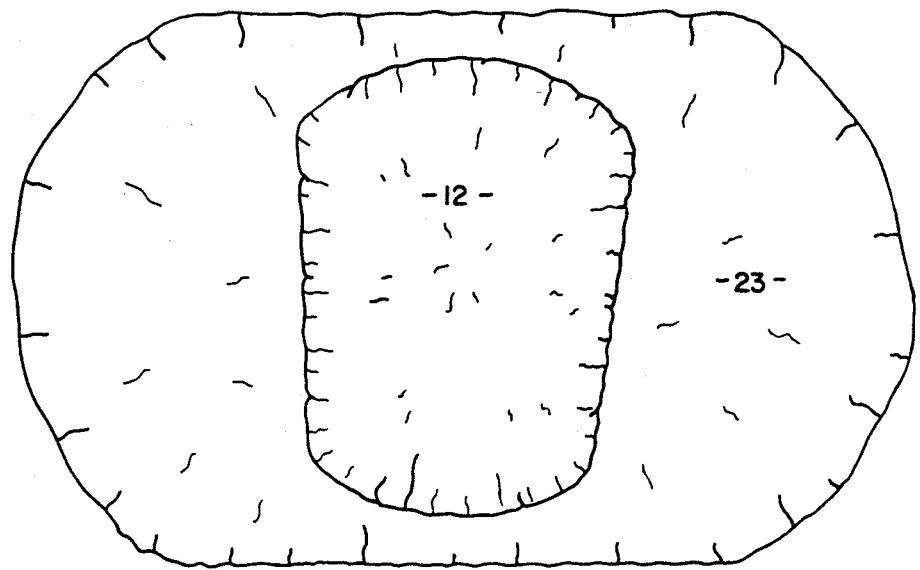
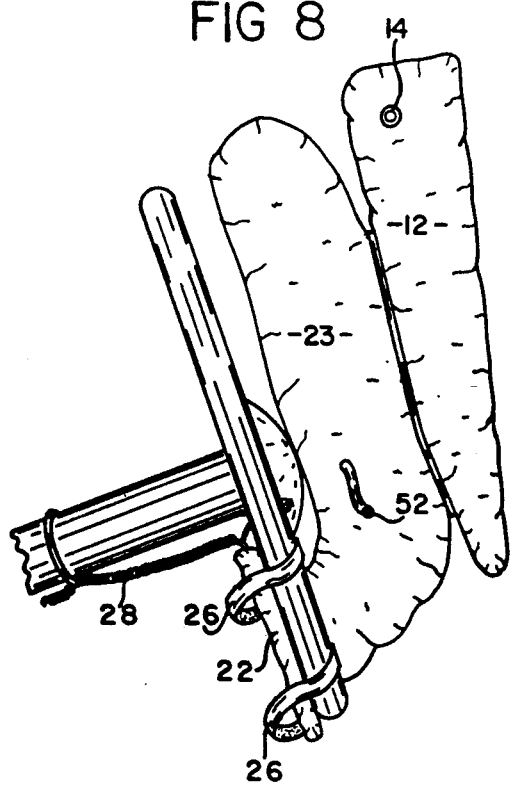
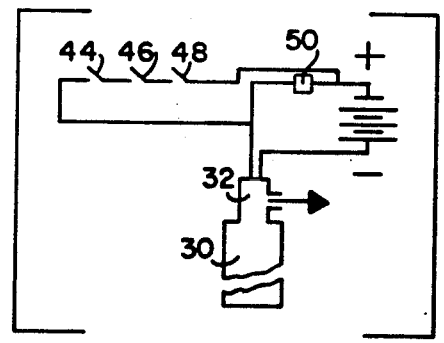

STEERING WHEEL DOUBLE AIR BAG PROTECTIVE SYSTEM

CROSS REFERENCE TO RELATED APPLICATION

The present invention is a continuation-in-part of Ser. No. 07/820,137, filed Jan. 13, 1992 by the same inventors and is incorporated herein by reference.

FIELD OF THE INVENTION

This invention relates to protective cushions or air bags and more particularly to dual cushions or air bags one of which is inflated on installation and the second, inflated by impact or manual activation.

BACKGROUND OF THE INVENTION

A number of safety devices for use in vehicles to protect vehicle occupants in the event of a collision are known and well documented in prior art. The most widely excepted and used are seat belts or shoulder belts which have saved many lives principally by keeping the occupants from being thrown about inside the vehicle or being thrown out of the vehicle, however, the typical seat belt does not protect the driver from coming into contact with the steering wheel.

In recent years apparatus has been developed which upon pressurized activation is propelled towards an occupant of the vehicle to prevent the occupant from striking the structure of the vehicle in the event of a collision such as the well known air bag protection device U.S. Pat. No. 3,799,576. The typical air bag apparatus comprises an inflatable, elastic container having little or no permeability to gas which at the instant of collision is explosively filled with a gaseous mixture by means of a suitable releasing arrangement. In its rest position the air bag is placed in tightly folded condition in a suitable container in the vehicle in front of the occupant it is designed to protect. In order to perform its function the air bag must be inflated within a few fractions of a second of the initial collisional impact and inflation in such a short period of time generally causes a sound in the vehicle corresponding to the decibel levels produced by detonation of a shotgun blast. Such sound levels commonly cause damage to the eardrums of the occupants in the vehicle. Another disadvantage in the use of the air bag system is the enormous increase in volume and pressure inside the vehicle when the air bag is activated. This also affects the eardrums of the occupants of the vehicle and commonly causes damage to certain parts of the vehicle body due to the increase in pressure. The doors of the vehicle are sometimes deformed by the increased pressure so that they can no longer be opened after the accident has occurred thereby causing an additional safety hazard.

Also, the air bags are triggered by a pre-set collision speed such as 15-25 M.P.H. and does not protect the driver from collision with the steering wheel at lower speeds of impact which can still cause serious injury and discomfort.

Also, the air bag is not readily reusable as it substantially fills the space in front of the driver and must be "re-placed" by experts in the field of air bags.

Also, the typical air bag is generally a factory item which is installed at the point of manufacture and to the knowledge of the present inventors is not an "add-on" feature.

An example of such an air cushion is the apparatus of U.S. Pat. No. 4,944,529 which teaches a cushion of substantially quadrilateral configuration and includes superposed congruent impact surfaces joined to each other along their longitudinal and lateral margins, by side surfaces folded inwardly.

All of the inflatable on contact "air bags" rely on sensor means which senses a pre-determined collision impact of a pre-determined force or mechanical releases such as the device taught by patent U.S. Pat. No. 3,799,576 and the safety of the occupant depends on the reliability of many elements, any one of which may fail under actual collision conditions.

Prior art safety devices, designed to provide impact energy absorbing protection when a vehicle operator is thrown forward onto the steering wheel upon the occurrence of a collision, have been designed for impacts by the entire upper body of the operator. Such prior art safety devices have therefore been designed for impacts in which the impact area is considerably large, corresponding to the entire upper body. Such impacts occur when the upper body is not restrained.

With the increased use of vehicle safety belts, particularly those which include a belt across the upper body of the vehicle occupants, such as a shoulder belt the frequency of driver impact on the steering wheel with the chest has been considerably decreased. In a collision, however even when an operator is using a seat and shoulder belt, it is possible for his head to be thrown forward in a nodding motion and impact upon the steering wheel. Motion of the vehicle steering wheel upwards and toward the back of the vehicle upon the occurrence of a severe collision can contribute to the tendency of the driver's head to strike the hub or spoke members on steering wheels and have not been designed for impact by the head of the vehicle operator, which involves a relatively small impact surface area as compared to impact by the upper body of the driver.

No means is provided for the operator of the vehicle to test the condition of the air bag or its inflating means and this problem is addressed by the present invention.

Two separate and distinct problems exist which have been addressed by the above noted and other prior art, i.e., that of slow speed impact and that of higher speed impacts.

High speed impact apparatus have been taught by prior art reference which include multiple compartments such as patent U.S. Pat. No. 3,752,501 which provide, when inflated, a peripheral rim compartmentation in juxtaposition to the steering wheel rim and center compartmentation in overlying juxtaposition to the steering wheel hub, however, this apparatus and other simulated devices are only activated on pre-set collision impact and provide no protection at lower speed as does the apparatus disclosed by the present inventors' '137 application.

While the '137 application of the present inventors addresses the problem of low speed impact it does not address the problem of higher speed impacts.

The present invention addresses both these problems and is a unique and distinct improvement over known prior art in that it provides an air bag which is inflated on assembly *and* an additional air bag which is inflated on impact, both associated in one unit.

SUMMARY OF THE INVENTION

It is therefore a primary object to provide dual air bag devices for protective interposition between a vehicle operator and the rim and hub of a vehicle steering wheel assembly under low and high vehicle collision conditions.

It is a further object to provide at least a first and second air bag, the second air bag being inflated on assembly and the first air bag being inflated on demand or by impact.

Another object is to provide attachment means designed to affix an air bag container device to a steering wheel which may be attached "after market".

Still another object is to provide means to manually activate said first air bag when the operator sees an impending potential disaster.

Another important object is to provide by the first air bag additional protection and support at 9:00 and 3:00 positions to aid in the containment of the vehicle operator.

Still another important object is to provide means to check the first air bag by providing means to inflate it manually to check its position, that is, blowing it up by mouth or by an air compressor.

Yet another object is to provide normally open switches wired in series such as might be connected to the brake light system, ignition system and a switch removably attached at a suitable location on the steering wheel so that unless *all* the switches are closed the first air bag will not be activated.

Another object is to provide a replacable gas generator system which may be easily replaced after being discharged.

Still another very important object is to provide a method by which the device may be added to an existing steering wheel, tested and then manually closed. The electrical circuits may be connected to the existing electrical power supply of the vehicle.

Other objects and advantages will become apparent when taken into consideration with the following drawings and specifications.

BRIEF DESCRIPTION OF THE DRAWINGS

FIG. 4 is a frontal view of the first inflatable air bag container.

FIG. 5 is a view of the back side of the first inflatable air bag container.

FIG. 6 is a perspective view of the closure means and second inflated air bag attachment means.

FIG. 7 is a frontal view of both first and second air bags after being inflated.

FIG. 8 is a side view of both air bags after being inflated.

FIG. 9 is a schematic of the electronics of the device.

DETAILED DESCRIPTION OF THE DRAWINGS

Figure 1:
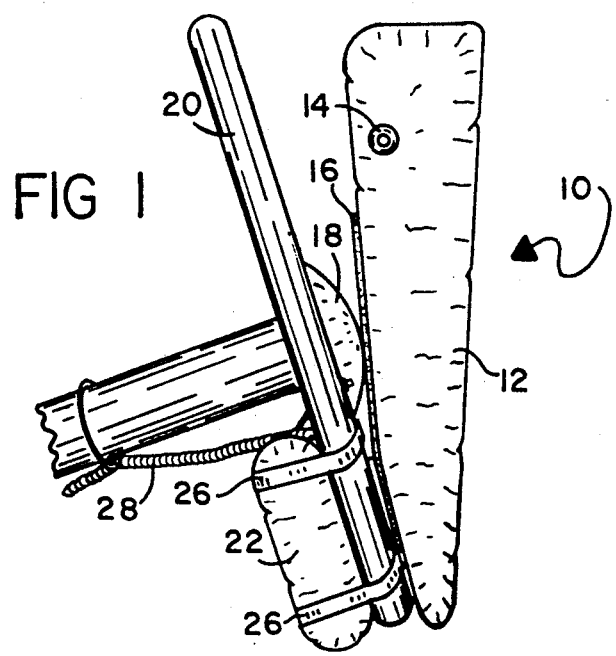
FIG. 1 is a side view of the preferred embodiment.
Figure 2:
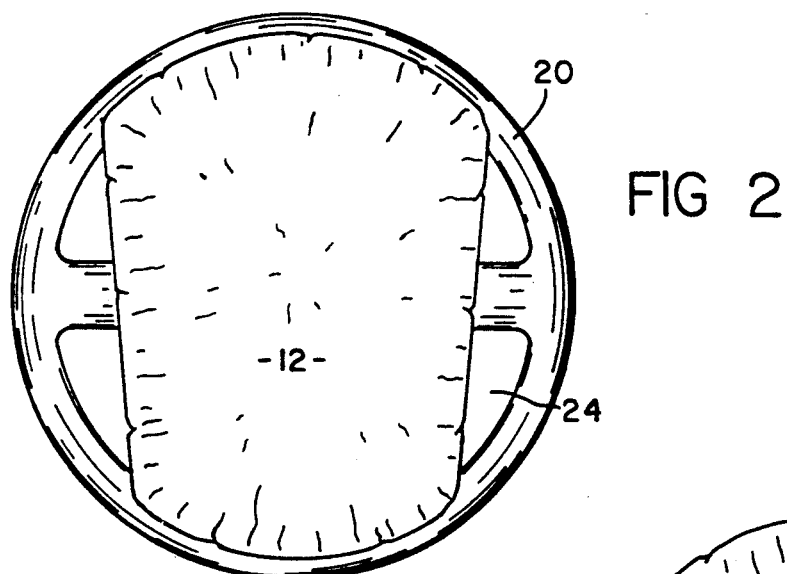
FIG. 2 is a frontal view.
Figure 3:
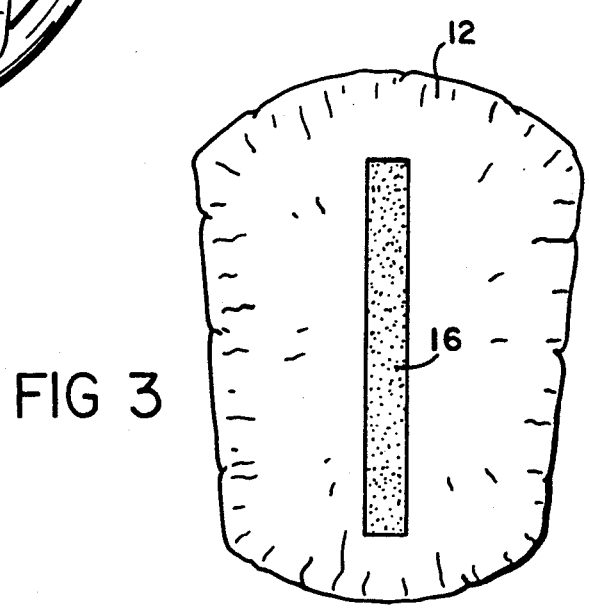
FIG. 3 is a view of the back side of the second inflated air bag.

Referring now in detail to the drawings wherein like characters refer to like elements throughout the various drawings, 10 in FIG. 1 is an overview of the apparatus which includes air bag 12, hereafter referred to as second air bag, which is inflated through valve 14 either by mouth or by other means such as a bicycle pump (not shown) with the second air bag 12, being made of suitable material such as plastic or the like which can hold air when inflated, with 16 being attaching means such as VELCRO or loop and pile fasteners and 18 is a typical horn button, 20 being a typical steering wheel of a host vehicle, while 22 is a bag or container or the like which houses another inflatable air bag, hereafter referred to as first air bag with said container being held in place in a cavity 24 within the steering wheel 20 as shown in FIG. 2. The bag or container 22 may extend behind, within, or somewhat in front of the steering wheel 20 and is removably attached to the steering wheel 20 by fastening means such as the loop and pile fastener straps 26 (VELCRO) which are adjustably affixed around the steering wheel. 28 is a "curly" cord which houses appropriate wires connecting the sensors or switches of the electronic schematic shown in FIG. 9 to inflating means such as a gas generator 30 shown in FIG. 10 which is detonated by an electro-explosive valve 32 of prior art construction such as produced by Special Devices of Ogden Utah or T.R.W. of Columbus, Ohio.

The bag or container 22, shown in FIG. 4, has a draw-string 34 captured by hem 36 which keeps retainer means 38, as shown in perspective in FIG. 6, in place, retainer means 38 being a flexible, substantially rectangular membrane made of a suitable material such as cardboard or light plastic and which supports fastening means 40 which may be loop and pile fasteners such as VELCRO, and cooperates with the loop and pile fastener 16 attached to the backside of the second air bag 12.

Figure 10:
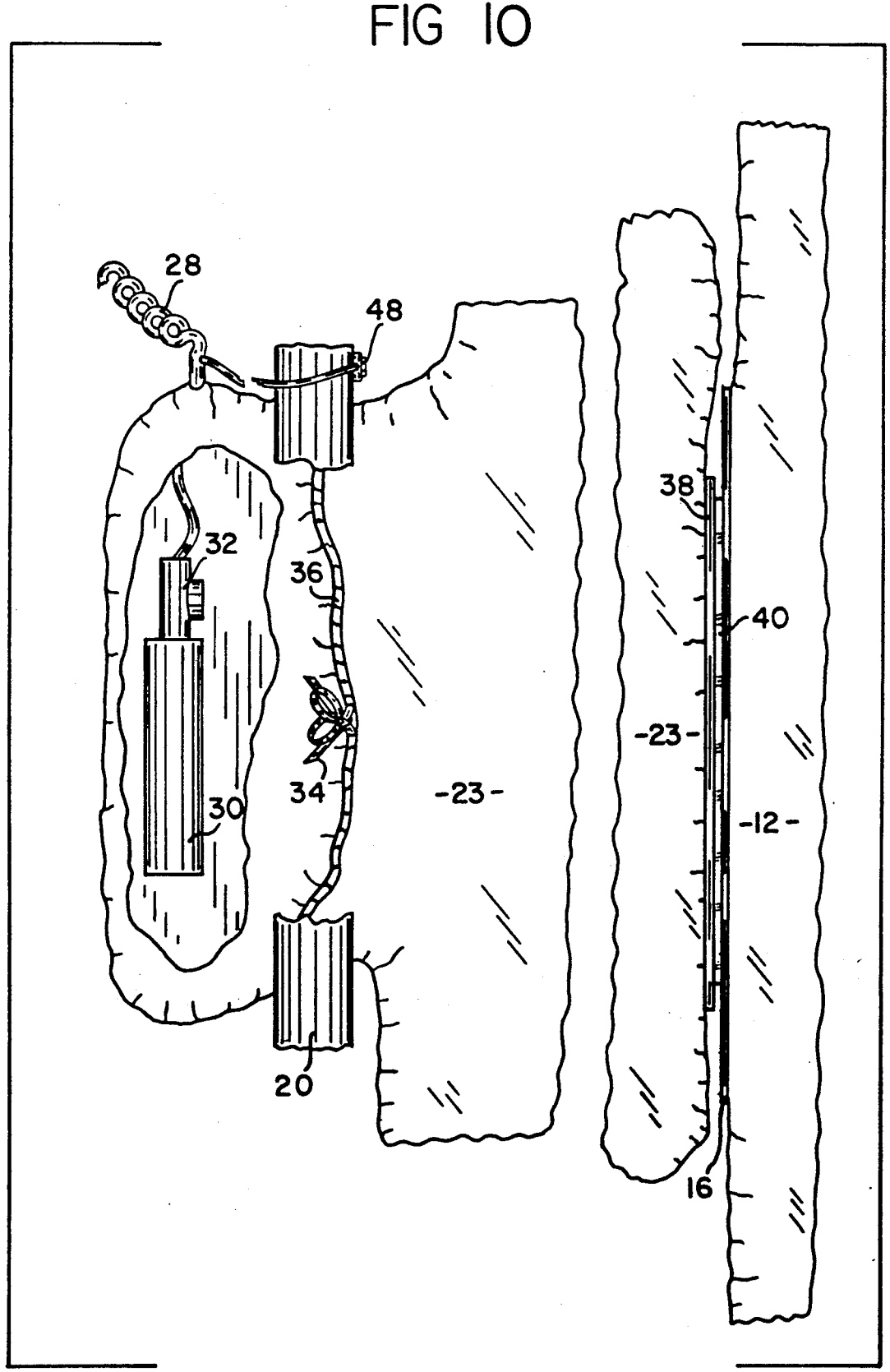
FIG. 10 is a partial, fragmented, cut-a-way view of the device affixed to a typical steering wheel with both first and second air bags in an inflated state.

In FIG. 9, the schematic shows switches 44, 46 and 48 respectively being in series so that all three must be closed to activate the electro-explosive valve 32 and the gas generator 30 with switches 44, 46 and 48, respectively being energized by means such as brakes, ignition switch and a manual switch, the manual switch being removably attached at a location of choice, such as shown in FIG. 8 and 10, on the steering wheel.

50 as shown in FIG. 9, is an impact sensor and switch, which when activated by impact, closes a separate circuit to activate electro-explosive valve 32 and gas generator 30 while 52 is a manual inflation stem or hose which allows the operator to inflate the first air bag by mouth or other means such as by a bicycle pump to check the air bag for leaks or placement and also acts as a deflation means after the emergency filling by the explosive gas generator 30.

It will now be seen that we have provided a unique, double air bag protective system, with the second air bag being inflated or deflated to a desired firmness on installation by the operator and which may be easily attached to the first air bag receptical retaining means in any comfortable position or may be removed at will instantaneously by brushing or knocking it off the first air bag retaining means with either hand if the driver for any reason feels a need to do so. It will be noted that the second air bag may also be used as a pillow for other activities such as ball games, etc.

The first air bag may be activated by the operator upon demand such as in an anticipated impending collision by putting on the brake while the ignition is on and activating the steering wheel switch which causes the gas generator to instantaneously blow up the first air bag, giving more protection to the face and chest of the driver particularly at 9:00 and 3:00 and after collision will de-flate itself through the open stem.

By the unusual configuration and arrangement of the apparatus, the gas generator and electro-explosive switch may easily be replaced and the first air bag repacked inside its container and the cardboard membrane, again replaced in a retaining position, thus eliminating the high cost of replacement of conventional, prior art air bags.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by Letters Patent is:

1. Apparatus for protective interposition between a vehicle operator and a vehicle steering wheel assembly under vehicle collision conditions, comprising; a first and second air bag, a container for said first air bag, means to mount said container within a cavity of said steering wheel, first and second inflator means for said first air bag, releaseably retaining means to secure said first air bag within the confines of said container when said air bag is in a deflated condition, means to release said means to secure said first air bag within said container when said first inflator means inflates said first air bag, inflator means for said second air bag, means to releaseably secure said second air bag to said retaining means of said first air bag, and means to activate said first inflator means of said first air bag when said vehicle is subject to a pre-determined impact force.

2. The apparatus of claim 1 in which said container is a bag, said bag being of a size and shape to contain said inflator and said first air bag, when said first air bag is in a deflated condition.

3. The apparatus of claim 1 in which said means to mount said container within a cavity of said steering wheel is multiple straps cooperating with loop and pile fasteners.

4. The apparatus of claim 1 in which said inflator means is a gas diffuser.

5. The apparatus of claim 1 in which said releaseably retaining means to secure said first air bag within the confines of said container when said first air bag is in a deflated condition is a membrane, said membrane being of a size and thickness to sufficiently support and restrain said first air bag within said container.

6. The apparatus of claim 1 in which said means to release said means to secure said first air bag within said container is an elastic draw-string suitably mounted around a flexible opening in said container, said container, said flexible opening and said means to secure said first air bag within said container cooperating together to form a first and second position, said first position securing said first air bag within the confines of said container and said second position allowing said first air bag to be released from said container.

7. The apparatus of claim 1 in which said inflator means for said second air bag is a valve, said valve cooperating with an independent air source.

8. The apparatus of claim 1 in which said means to releaseably secure said second air bag to said retaining means of said first air bag is a loop and pile fastener.

9. The apparatus of claim 1 in which said means to activate said inflator means of said first air bag is by a first electrical circuit, said first electrical circuit including a battery, impact sensor means and an electrically activated switch, said switch cooperating with said inflator means to activate said inflator means when said first circuit is closed.

10. The apparatus of claim 1 including a second electrical circuit which when activated by the operator will activate said inflator means.

11. The apparatus of claim 10 in which said second electrical circuit includes multiple normally open switches, said switches working in conjunction with the brake system, ignition system of the host vehicle and a manually operated switch, whereby, the brake circuit and ignition circuit must be energized before the manually operated switch can activate said second inflator circuit.

12. The apparatus of claim 1 in which said second inflator means, is an open tube communicating from ambient air to the inside of said first air bag, said open tube allowing an operator to inflate and deflate said first air bag without energizing said first inflator means, said open tube allowing said first air bag to deflate after being energized by said first inflator means.

13. A method of assembling, installing, checking and positioning a first and second air bag and inflation means thereof on a steering wheel comprising the steps of;

a. attaching and securing said first air bag container within a cavity between the spokes of a steering wheel;

b. connecting appropriate electrical connectors to the proper circuits of the host vehicle;

c. placing and properly connecting a gas generator and activator switch within said first air bag container to said electrical circuits and the gas input of said first air bag;

d. folding said first air bag around said gas generator and said activator switch within said container;

e. placing a retaining membrane over said first air bag within a flexible opening in said container;

f. positioning a releaseable retaining means to hold said membrane in place within said container;

g. inflating a second air bag to a desired firmness;

h. releaseably affixing said second air bag on said membrane in a desired position; whereby;

when the host vehicle of said steering wheel is subjected to a light collision in comparison to a heavy collision, said second air bag protects the vehicle operator from violent contact with said steering wheel and in the event of a heavy collision, said first air bag is activated automatically to further protect the operator from contact with said steering wheel.

14. The method as set forth in claim 13 including; installing at a location of choice, such as on the rim of the steering wheel, a manual switch; whereby, when said manual switch is activated by the vehicle operator with the ignition switch on and the brake system energized, said first air bag is activated providing further protection between the operator and said steering wheel.

15. The method as set forth in claim 13 including a method of re-loading and re-assembling, said first and second air bags and said inflation means comprising the steps of;

a. removing said first and second air bags from said apparatus;

b. unpluging and removing said inflation means from said first air bag container;

c. installing a new, unused inflation means into the first air bag container; and following steps c through g of claim 13.

* * * * *